United States Patent [19]

Hasegawa

[11] Patent Number: 4,641,322
[45] Date of Patent: Feb. 3, 1987

[54] SYSTEM FOR CARRYING OUT SPREAD SPECTRUM COMMUNICATION THROUGH AN ELECTRIC POWER LINE

[75] Inventor: Satoshi Hasegawa, Tokyo, Japan

[73] Assignee: NEC Corporation, Tokyo, Japan

[21] Appl. No.: 662,111

[22] Filed: Oct. 18, 1984

[30] Foreign Application Priority Data

Oct. 18, 1983 [JP] Japan .............................. 58-194908
Feb. 2, 1984 [JP] Japan ................................ 59-17353
Jul. 3, 1984 [JP] Japan .............................. 59-137609

[51] Int. Cl.$^4$ ............................................. H04B 3/54
[52] U.S. Cl. .................................... 375/1; 340/310 A; 340/825.08
[58] Field of Search .................. 375/1, 111, 113, 115; 340/825.08, 310 R, 538; 455/38, 58; 370/18, 85, 91, 93, 96

[56] References Cited

U.S. PATENT DOCUMENTS

| | | | |
|---|---|---|---|
| 2,435,010 | 1/1948 | Knapp et al. | 455/58 |
| 3,098,215 | 7/1963 | Waite | 370/96 |
| 3,475,558 | 10/1969 | Cahn | 375/1 |
| 4,307,380 | 12/1981 | Gander | 375/1 |
| 4,438,519 | 3/1984 | Bose | 375/1 |
| 4,468,792 | 8/1984 | Baker et al. | 375/1 |
| 4,517,679 | 5/1985 | Clark et al. | 375/1 |

Primary Examiner—Benedict V. Safourek
Attorney, Agent, or Firm—Sughrue, Mion, Zinn, Macpeak & Seas

[57] ABSTRACT

A communication system for carrying out communication between a plurality of stations through an electric power line operating in a commercial power frequency band. Spread spectrum modulation of an information signal, employing a pseudorandom code sequence is used at a transmitting station. Spread spectrum demodulation is carried out in a receiving station to reproduce the information signal. The modulated signal is spread over a wide frequency band different from the commercial frequency band. Each station may comprise both of a transmitter and a receiver, and may be specified by a an assigned destination address that also is transmitted. The destination station address may be indicated either by an address signal or by an additional pseudorandom code sequence peculiar to a destination station. Alternatively, polling operation is carried out through the electric power line by a polling station to select one of the stations. Preferably, another pseudorandom code sequence is superposed on the modulated signal so as to specify a synchronization signal and different from the pseudorandom code sequences conveying the information signal and/or the destination address.

14 Claims, 28 Drawing Figures (a)

(b)

(c)

SYSTEM FOR CARRYING OUT SPREAD SPECTRUM COMMUNICATION THROUGH AN ELECTRIC POWER LINE

BACKGROUND OF THE INVENTION

This invention relates to a system for use in carrying out communication between a plurality of stations through an electric power line, such as a power transmission line, a distribution line, or the like.

As a rule, an electric power line of the type described serves to deliver electric power of a commercial frequency to a wide variety of loads connected thereto. The electric power falls within a commercial frequency band. Various attempts have been made to transmit an information signal between stations through such an electric power line. In this case, it is to be noted that the electric power line is put in bad circumstances for transmission of the information signal because noises, such as a corona noise and the like, or undesired signals, such as harmonic waves of a commercial frequency, inevitably appear on the electric power line. In addition, a variation of the loads gives rise to a variation of a noise characteristic and a transmission characteristic of the electric power line. Anyway, the characteristics of the electric power line are widely variable with time.

Furthermore, transmission of the information signal should not adversely affect any other systems or devices coupled to the electric power line. A limited electric power is therefore shared with transmission of the information signal and degrades a quality of the transmission.

In a paper contributed by Michell Lee to IEEE Transactions on Consumer Electronics, Vol. CE-28, No. 3, August 1983, pages 409-413, and titled "A NEW CARRIER CURRENT TRANSCEIVER I.C.," a conventional system is disclosed which comprises a transmitter for carrying out FSK modulation to transmit a modulated signal conveying an information signal to an A.C. line, namely, an electric power line and a receiver for demodulating the modulated signal by the use of a phase lock loop. The modulated signal falls within a specific frequency band which is different from that of the electric power.

Both of the transmitter and the receiver might be incorporated into a station coupled to the electric power line. In this case, a plurality of stations may be connected to the electric power line to carry out communication therebetween.

As will later be described in conjunction with a few figures of the accompanying drawing, the modulated signal is undesiredly deteriorated by noises because the noises may fall within the specific frequency band. In addition, the characteristics may vary in the specific frequency band.

SUMMARY OF THE INVENTION

It is an object of this invention to provide a system which is capable of carrying out communication between a transmitter and a receiver through an electric power line at a high speed and with a high reliability.

It is another object of this invention to provide a system of the type described, wherein communication is possible between two of stations in a multiple access manner.

A system to which this invention is applicable is for use in conveying a transmission signal from a transmission station to a reception station through an electric power line for electric power of a commercial frequency following within a first frequency region. According to this invention, the transmission station comprises modulation means responsive to the transmission signal for carrying out spread spectrum modulation of the transmission signal to produce a modulated signal which is subjected to the spread spectrum modulation and which is dispersed in a second frequency region different from the first frequency region and sending means coupled to the electric power line and the modulation means for sending the modulated signal to the electric power line. The reception station comprises extracting means coupled to the electric power line for extracting the modulated signal from the second frequency region to produce an extracted signal, demodulation means coupled to the extracting means for demodulating the extracted signal into a demodulated signal carrying the information signal, and means for deriving the transmission signal from the demodulated signal.

DESCRIPTION OF THE PREFERRED EMBODIMENTS

PRIOR ART

Figure 1:
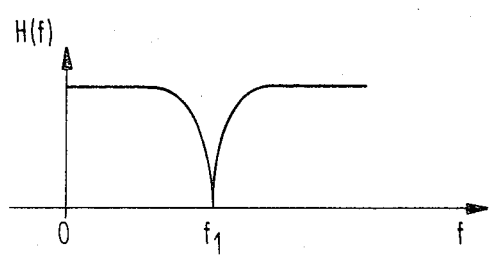
FIG. 1 exemplifies a transmission characteristic on an electric power line.
Figure 2:
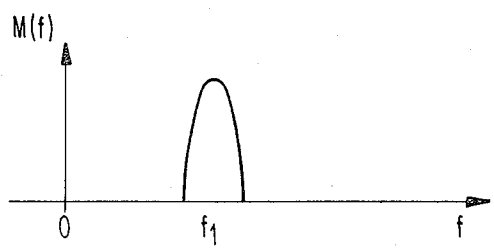
FIG. 2 exemplifies a modulation spectrum of a modulated signal transmitted to the electric power line.
Figure 3:
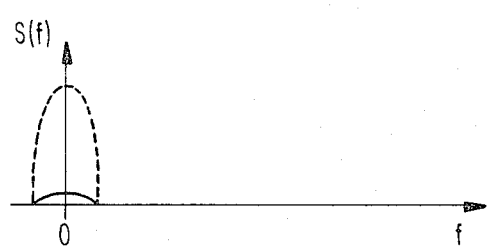
FIG. 3 exemplifies a demodulation spectrum of a demodulated signal sent through the electric power line having the transmission characteristic shown in FIG. 1.

Referring to FIGS. 1 through 3, description will be made as regards a conventional method of carrying out amplitude modulation, phase modulation, frequency modulation, or any other modulation. As shown in FIG. 1, let an electric power line have a transmission characteristic H(f) having a null point or zone at a high frequency $f_1$. The high frequency $f_1$ is different from a commercial frequency of electric power delivered to various loads connected to the electric power line. A frequency band for the commercial frequency is herein called a first frequency band.

On the other hand, let the modulation be carried out by the use of a central frequency equal to the frequency $f_1$ to transmit a modulated signal to the electric power line. As shown in FIG. 2, such a modulated signal exhibits a modulation spectrum M(f) locally laid in a frequency band adjacent to the central frequency.

When the modulated signal is transmitted through the electric power line having the transmission characteristic shown in FIG. 1 and is subjected to demodulation, a demodulated signal has a demodulation spectrum S(f) depicted in FIG. 3. The demodulation spectrum S(f) is seriously reduced or deteriorated in comparison with the modulation spectrum M(f). Therefore, transmission performance is degraded unfavorably.

In addition, the transmission characteristic is variable with time. As a result, the null point irregularly moves with time. This widely varies electric power of the demodulated signal and makes it difficult to achieve stable communication.

From the above, it is readily understood that the conventional modulation method is not suitable for a transmission system which carries out transmission through an electric power line.

Principle of the Invention

Figure 4:
FIGS. 4(a) through 4(c) are time charts for use in describing a principle of this invention.
Figure 4:
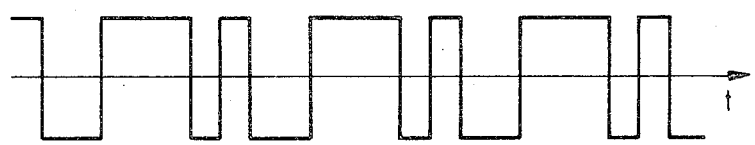
Figure 4:
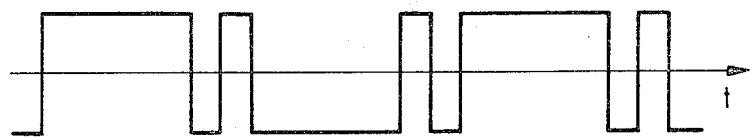

Referring to FIG. 1 again and FIG. 4 afresh, a principle of this invention is to carry out spread spectrum communication through the electric power line. For this purpose, spread spectrum modulation and demodulation are carried out in a transmitter and a receiver, respectively.

Such spread spectrum communication is usually used in a radio communication system because the spread spectrum communication is strong against fading, a local noise over a narrow band, and the like and has a high secrecy. However, the spread spectrum communication is scarcely applied to a wire communication system, such as an electric power line system.

Figure 5:
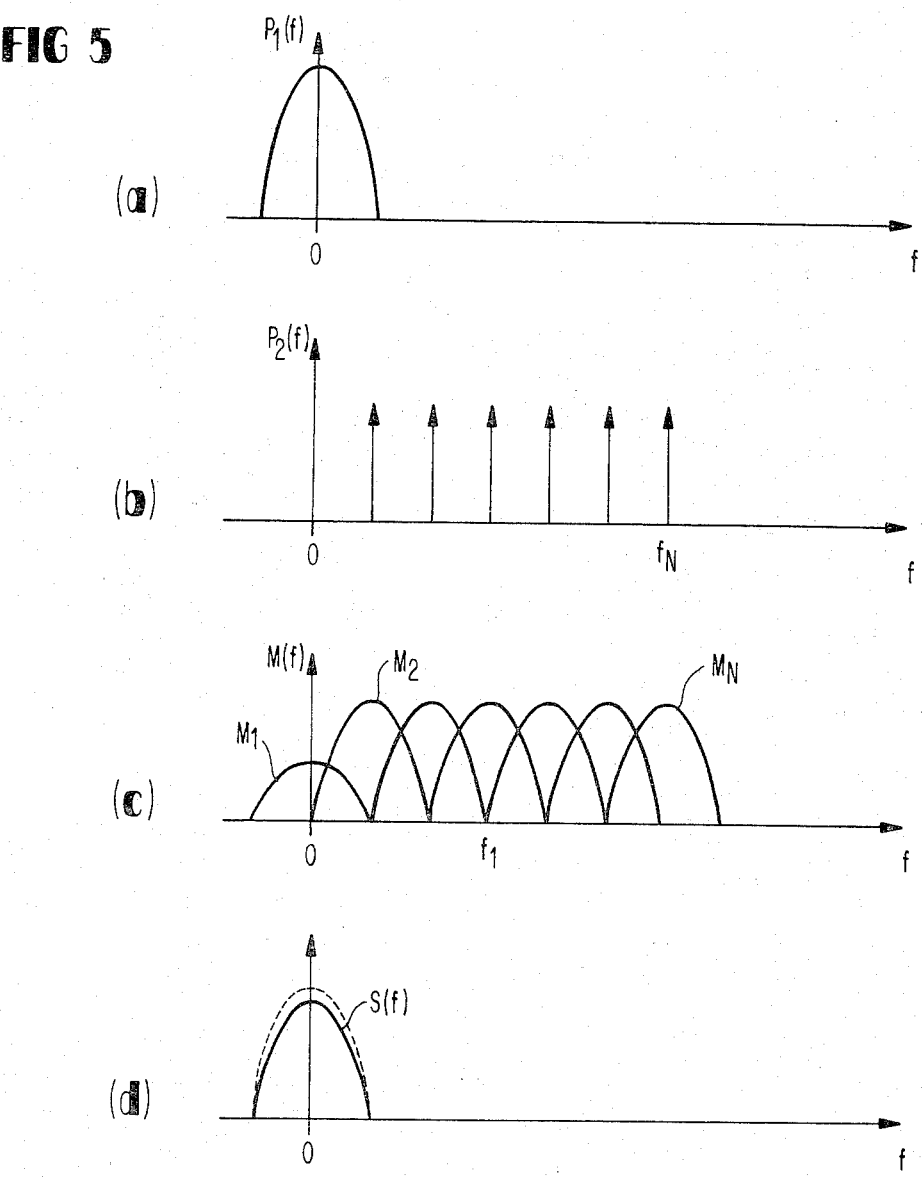
FIGS. 5(a) through 5(d) exemplify power spectra corresponding to FIGS. 4(a) through 4(c), respectively.

The spread spectrum communication will be described hereinunder. Let the information signal exhibit a waveform along an axis of time (t) as shown in FIG. 4(a) and a first power spectrum P(f) along an axis of frequency (f) as shown in FIG. 5(a). The information signal is a succession of data pulses produced at a data rate.

As shown in FIG. 4(b), a pseudorandom code sequence is produced in synchronism with a succession of clock pulses having a clock rate higher than the data clock rate and is repeated at a frame period equal to a reciprocal of the data rate. The frame period is determined by a code length of the pseudorandom code sequence. Anyway, a single one of the data pulses appears during each frame period.

Such a pseudorandom code may be a maximum length code known in the art and has a second power spectrum $P_2(f)$ along an axis of frequency, as shown in FIG. 5(b). The second power spectrum $P_2(f)$ has a plurality of frequency components dispersed in a wide frequency band defined by the code length of the pseudorandom code sequence. More specifically, a maximum one of the frequency components is represented by $f_N$, if the code length is specified by N.

The pseudorandom code sequence is modulated by the information signal into a modulated signal as shown in FIG. 4(c) according to the spread spectrum modulation. The spread spectrum modulation is possible by a multiplier for calculating a product between the information signal and the pseudorandom code sequence. The modulated signal exhibits a modulation spectrum M(f) divisible into a plurality of partial spectra depicted at $M_1$ through $M_N$ which are specified by main envelopes and are laid in the vicinity of the frequency components shown in FIG. 5(b), respectively.

Each of the partial spectra $M_1$ through $M_N$ uniformly includes a signal component of the information signal distributed thereto in the manner known in the art. Thus, the modulation spectrum is distributed like a white noise to the wide frequency band proportional to the code length of the pseudorandom code sequence.

Let the modulated signal be transmitted through the electric power line having the transmission characteristic H(f) shown in FIG. 1. When the modulated signal is demodulated into a demodulated signal by the receiver, the demodulated signal has a demodulation spectrum S(f) as shown at a real line in FIG. 5(a). The demodulation spectrum S(f) is hardly reduced despite the fact that the transmission characteristic has the null point at the frequency $f_1$. This is because the modulation spectrum M(f) is spread over the wide frequency band as exemplified in FIG. 5(c) and a reduction of electric power of the modulated signal is very small even when a null point or points locally appear on the electric power line. Accordingly, it is possible with this invention to realize communication which is strong against a selective jamming wave or noise. This means that the communication can be carried out with a high reliability and at a high speed.

Herein, the pseudorandom code sequence takes a plurality of phases during the frame period and may be modified in phase into modified code sequences which can form different pseudorandom code sequences, respectively, in the manner which is also known in the art. Such modification is possible by indicating initial phases of the pseudorandom code sequences.

FIRST EMBODIMENT

Figure 6:
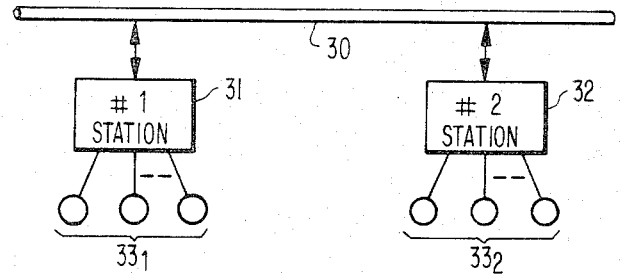
FIG. 6 is a block diagram of a communication system according to each of first through third embodiments of this invention.

Referring to FIG. 6, a communication system according to a first embodiment of this invention comprises an electric power line 30 which may be either to power transmission line or a distribution cable. A plurality of stations are coupled to the electric power line 30, although only two stations are illustrated in FIG. 6 and will be referred to as first and second stations denoted by 31 and 32, respectively. In the example being illustrated, each of the first and second stations 31 and 32 carries out both of transmission and reception through the electric power line 30. The first and second stations 31 and 32 can optionally be connected to or disconnected from the electric power line 30 by receptacles (not shown). In other words, each station is not actively coupled to the electric power line 30 but is passively coupled to the line 30.

It should be noted here that station addresses are preassigned to the respective stations.

A plurality of terminal units collectively denoted by $33_1$ and $33_2$ are connected to the first and second stations 31 and 32, respectively. From this fact, it is readily understood that communication is finally carried out between two of the terminal units $33_1$ and $33_2$. Each of the terminal units $33_1$ and $33_2$ comprises an input and an output device. Despite the terminal units $33_1$ and $33_2$, description will mainly be directed to communication between the first and second stations 31 and 32.

Figure 7:
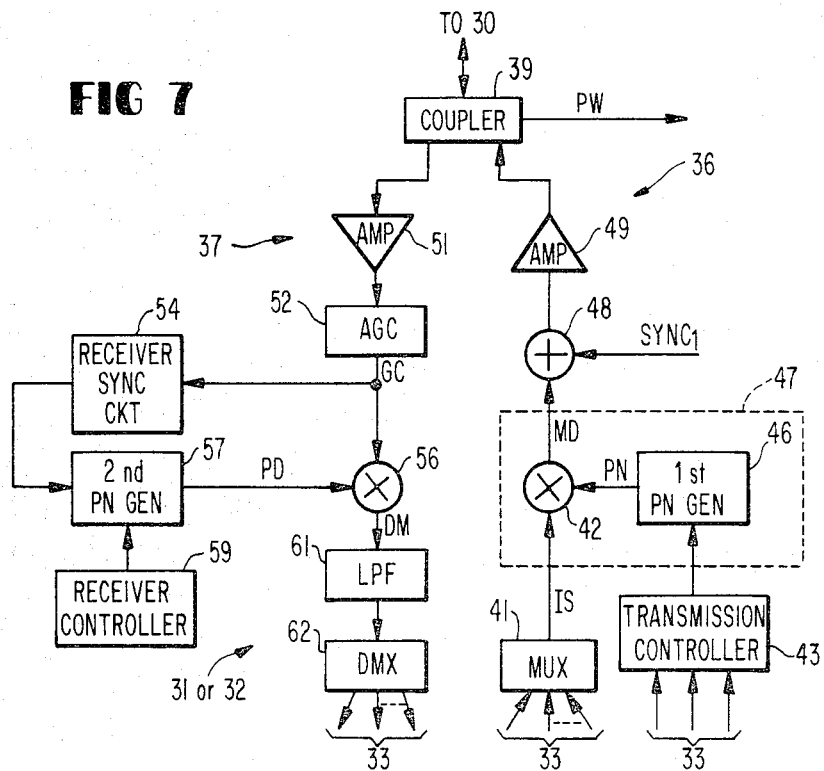
FIG. 7 is a block diagram of a station for use in the communication system according to the first embodiment of this invention.

Referring to FIG. 7 afresh and FIG. 6 again, each of the first and second stations 31 and 32 comprises a transmitter 36 and a receiver 37 for carrying out the transmission and reception, respectively, in the manner which will later be described more in detail. A coupler 39 is common to the transmitter 36 and the receiver 37 and operable as parts of the transmitter 36 and the receiver 37. The coupler 39 is coupled through the receptacle (not shown) to the electric power line 30. In addition, the coupler 39 is operable to deliver electric power PW of the commercial frequency to various electric devices (not shown).

The transmitter 36 comprises a multiplexer 41 supplied with input signals from the input devices of the terminal units 33 (suffixes omitted). The input signals are multiplexed by the multiplexer 41 into a multiplexed signal and is sent to a transmitter multiplier 42. The multiplexed signal may be called an information signal IS conveying information. For simplicity of description, it will be assumed that the information signal IS is transmitted from the first station 31 for reception by the second station 32. In this event, the first and second stations 31 and 32 may be referred to as an originating and a destination station, respectively.

In order to deliver the information signal IS to the destination station, it is necessary to indicate a destination address assigned to the destination station. To this end, the destination address is specified by a transmission controller 43 which is operable in cooperation with the terminal units 33. In the example being illustrated, the destination address is sent to a first pseudorandom noise (PN) generator 46.

The first PN generator 46 may be a combination of flip flops and Exclusive OR gates in the manner well known in the art and can generate a plurality of pseudorandom code sequences which are equal in code length to one another and different in phase from one another, when initial phases of the respective pseudorandom code sequences are indicated, as suggested before.

Taking the above into consideration, the plurality of pseudorandom code sequences are made to correspond to the respective station addresses and are used to specify the respective station addresses in the example being illustrated. Each of the pseudorandom code sequences PN may be called a pseudorandom noise sequence.

The destination address indicated by the transmission controller 43 is given to the PN generator 46 as an initial phase signal indicative of one of the initial phases that specifies a selected one of the pseudorandom code sequences PN. The selected pseudorandom code sequence will be referred to as a modulation pseudorandom code sequence and is sent to the multiplier 42.

The transmitter multiplier 42 carries out product modulation between the information signal IS and the selected pseudorandom code sequence PN to produce a product signal or modulated signal MD representative of a product therebetween. The product signal has a modulation spectrum spread over a wide frequency band as illustrated in FIG. 5(c). Accordingly, the product modulation may be called spread spectrum modulation. A combination of the transmitter multiplier 42 and the first PN generator 46 may be called a modulator 47.

An adder 48 adds the modulated signal MD to a transmitter synchronization signal $SYNC_1$ to supply the coupler 39 with a sum signal representative of the sum through a transmitter amplifier 49. The transmitter synchronization signal $SYNC_1$ is produced in a manner to be described later and may be formed by an additional pseudorandom code sequence of a period which is equal to the pseudorandom code sequences generated by the first PN generator 46 and which is different from all of the pseudorandom code sequences. The transmitter synchronization signal $SYNC_1$ serves to define each frame of the selected or modulation pseudorandom code sequence.

The coupler 39 sends the sum signal to the electric power line 30 as a transmitter output signal after it attenuates a low frequency component of the sum signal falling within the first frequency band for the commercial frequency. Thus, the transmitter output signal is not superposed in frequency on the electric power signal PW of the commercial frequency and is widely dispersed in the second frequency band. The adder 48, the transmitter amplifier 49, and the part of the coupler 39 may be called a sending circuit for sending the modulated signal to the electric power line 30.

Let the illustrated receiver 37 be used in the second or destination station 32 (FIG. 6) rather than in the first or originating station. The transmitter output signal arrives at the second station 32 as a receiver input signal through the electric power line 30 and is extracted by the coupler 39 from the electric power signal PW. The receiver input signal is supplied through a receiver amplifier 51 to an automatic gain control (AGC) circuit 52. The AGC circuit 52 has a dynamic range enough to compensate for a variation of a dead loss on the electric power line 30 and produces a gain controlled signal GC having substantially constant electric power. The AGC circuit 52 will later be described as regards its operation and structure in detail.

The gain controlled signal GC includes the transmitter synchronization signal $SYNC_1$ and the selected pseudorandom code sequence $PN_1$ modulated by the information signal IS, like the transmitter output signal. The gain controlled signal GC is delivered from the AGC circuit 52 to a receiver synchronization circuit 54 and a receiver multiplier 56.

The receiver synchronization circuit 54 derives a clock signal and a frame signal from the gain controlled signal GC. The frame signal reproduces the frame specified by the transmitter synchronization signal $SYNC_1$ while the clock signal specifies clock components included in the gain controlled signal GC. Operation and structure will become clear later.

The clock signal and the frame signal are supplied to a second pseudorandom noise (PN) generator 57. The second PN generator 57 is operable in response to an initial phase signal supplied from a receiver controller 59. The initial phase signal specifies an initial phase of a demodulation pseudorandom code sequence PD assigned to the second or destination station 32.

As a result, the second pseudorandom noise generator 57 supplies the receiver multiplier 56 with the demodulation pseudorandom code sequence PD. In the example being illustrated, the demodulation pseudorandom code sequence PD is assumed to be coincident with the modulation pseudorandom code sequence PN.

Under the circumstances, the receiver multiplier 56 carries out product demodulation to demodulate the gain controlled signal GC into a demodulated signal DM. The demodulated signal DM is filtered through a low-pass filter 61 into a reproduction of the information signal IS. The reproduction of the information signal IS may be called a reception signal and is delivered through a demultiplexer 62 to a destination one of the terminal units $33_2$ of the second station 32.

SECOND EMBODIMENT

Figure 8:
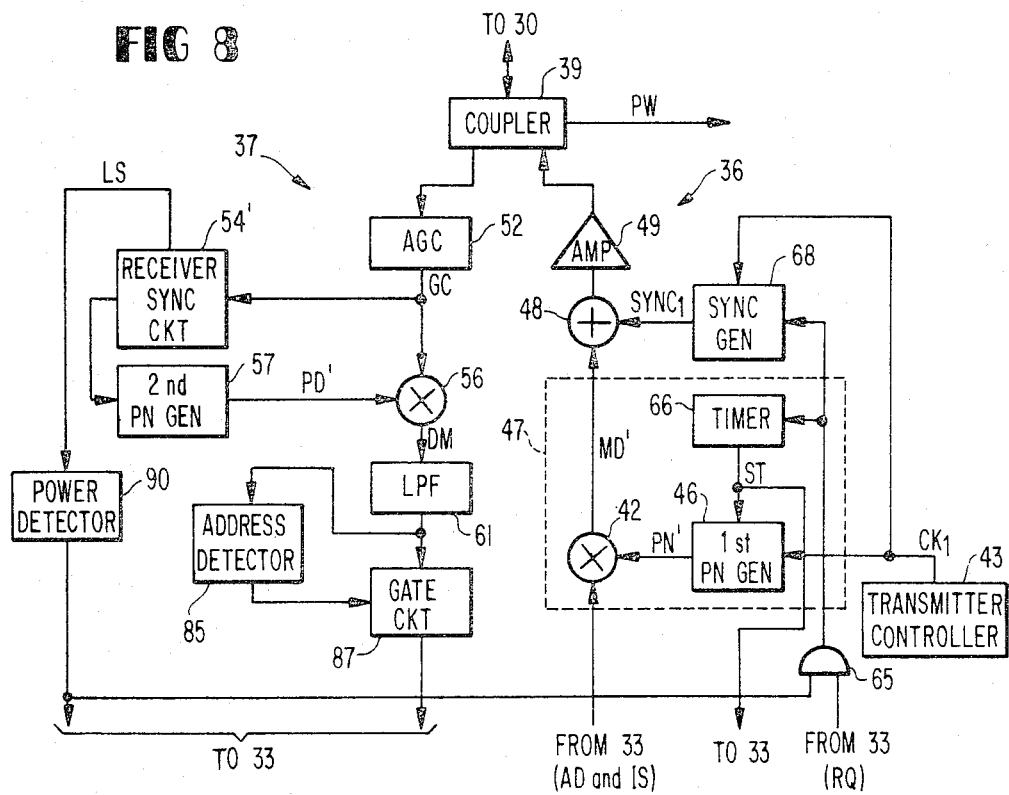
FIG. 8 is a block diagram of a station for use in the communication system according to the second embodiment of this invention.

Referring to FIG. 8, a station is for use as each station of a communication system according to a second embodiment of this invention and comprises similar parts designated by like reference numerals and symbols. For brevity of description, the illustrated station is assumed to be operable in cooperation with a single terminal unit 33 (FIG. 6). It is to be noted that a preselected pseudorandom code sequence which has a predetermined phase is used in common to the plurality of stations as shown in FIG. 8. In other words, the preselected pseudorandom code sequence is kept unchanged in phase. This means that a destination address is given to each station in the form of a destination address signal AD specifying a destination station assigned to a destination station. The destination address signal AD is produced by the terminal unit 33 and is followed by the information signal IS.

In addition, the transmitter 36 is operable in relation to the receiver 37 in a manner to be described later. It suffices to say that the transmitter 36 is operated only when the electric power line 30 is not used by other stations than the illustrated station.

Let the information signal IS be transmitted from the first station 31 to the second station 32, like in FIG. 7, and the illustrated station be at first used as the first station 31. In this event, a transmission request signal RQ of a logic "1" level is given prior to transmission of the information signal IS from the terminal unit 33 of the first station 31 to an AND gate 65 in a manner to be described later. The AND gate 65 is supplied with the logic "1" level and the logic "0" level when the electric power line 30 is being unused and used, respectively.

When the logic "1" level is given from the receiver 37 during presence of the transmission request signal RQ, the AND gate 65 delivers a logic "1" level signal to a modulator 47. The illustrated modulator 47 comprises a timer 66 in addition to the multiplier 42 and the first PN generator 46. The timer 66 is enabled or energized in response to the logic "1" level signal sent from the AND gate 65 and times or measures a predetermined duration $T_0$. In this sense, the AND gate 65 and the logic "1" level signal may be referred to as an energizing circuit and an energizing signal, respectively.

After lapse of the predetermined duration $T_0$, the timer 66 supplies the first PN generator 46 and the terminal unit 33 with a start pulse ST indicative of a start of operation. The first PN generator 46 delivers the preselected pseudorandom code sequence denoted by PN' to the transmitter multiplier 42 in synchronism with a sequence of transmitter clock pulses $CK_1$ which is given from the transmitter controller 43, although not explicitly described in conjunction with FIG. 7.

Responsive to the start pulse ST, the terminal unit 33 supplies the transmitter multiplier 42 with the destination address signal AD followed by the information signal IS, as mentioned before. As a result, the preselected pseudorandom code sequence PN' is modulated by the destination address signal AD and by the information signal IS and sent as a modulated signal MD' to the adder 48.

As illustrated in FIG. 8, a synchronization signal generator denoted by 68 is coupled to the adder 48 to generate the transmitter synchronization signal $SYNC_1$. The synchronization signal generator 68 is energized by the logic "1" level signal, namely, energizing signal and begins to produce the transmitter synchronization signal $SYNC_1$. Consequently, the transmitter synchronization signal $SYNC_1$ precedes the modulated signal MD' by the predetermined duration $T_0$. This means that the transmitter synchronization signal $SYNC_1$ alone appears the predetermined duration $T_0$ and thereafter the modulated signal MD' is superposed on the transmitter synchronization signal $SYNC_1$. Anyway, the sum signal between the transmitter synchronization signal $SYNC_1$ and the modulated signal MD' is sent as a transmitter output signal from the adder 48 through the transmitter amplifier 49 and the coupler 39 to the electric power line 30.

Let the transmitter output signal mentioned above be received as a receiver input signal by the second station 32. The illustrated receiver 37 is assumed to be used in the second station 32 for brevity of description. The receiver input signal is extracted from the electric power signal PW by the coupler 39 to be sent through the receiver amplifier (not shown in this figure) to the AGC circuit 52. The gain controlled signal GC is delivered from the AGC circuit 52 to a receiver synchronization circuit 54'.

Figure 9:
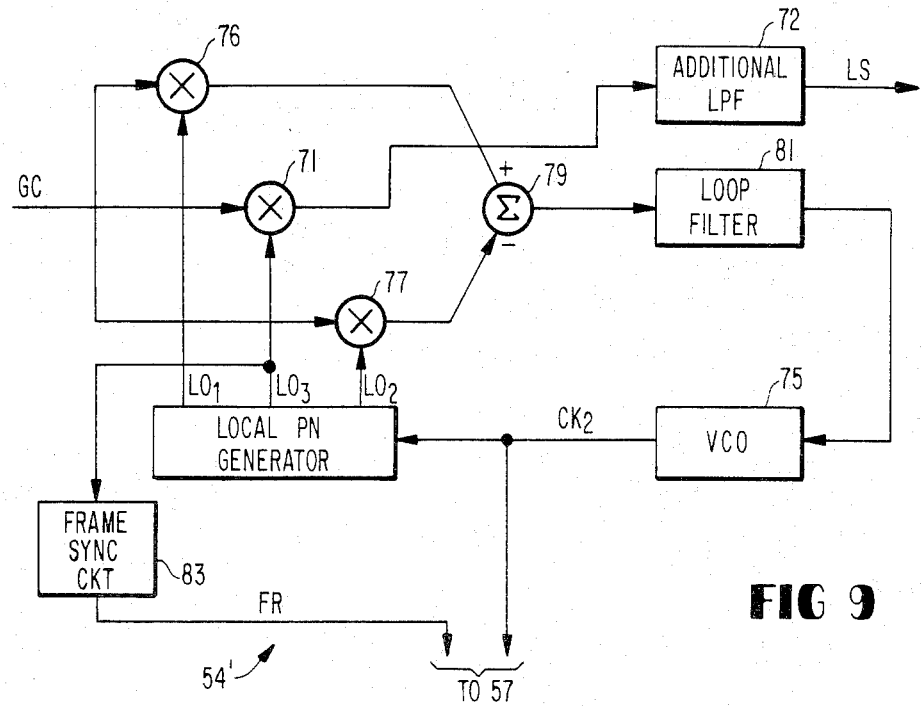
FIG. 9 is a block diagram of a receiver synchronization circuit for use in the station illustrated in FIG. 8.

Temporarily referring to FIG. 9, the receiver synchronization circuit 54' is similar to the receiver synchronization circuit 54 illustrated in FIG. 7 except that an additional multiplier 71 and an additional low-pass filter 72 is used in the illustrated receiver synchronization circuit 54'. The remaining part forms a delay lock loop known in the art.

More particularly, the receiver synchronization circuit 54' comprises a local pseudorandom noise (PN) genrator 73 which is put into operation in synchronism with a sequence of receiver clocks $CK_2$ produced by a voltage controlled oscillator (VCO) 75. The local PN generator 73 generates a first local PN code sequence $LO_1$ identical with the transmitter synchronization signal $SYNC_1$ and a second local PN code sequence $LO_2$ delayed by two bits, namely, two clocks relative to the first local PN code sequence $LO_1$. The illustrated local PN generator 73 also generates a third local PN code sequence $LO_3$ delayed by a single bit relative to the first local PN code sequence $LO_1$.

The first and the second local PN code sequences $LO_1$ and $LO_2$ are delivered to first and second multipliers 76 and 77, respectively, while the third local PN code sequence $LO_3$ is delivered to the additional multiplier 71. The first and the second multipliers 76 and 77 calculate first and second products between the gain controlled signal GC and the first local PN code sequence $LO_1$ and between the gain controlled signal GC and the second local PN code sequence $LO_2$, respectively. In other words, each of the first and the second multipliers 76 and 77 calculate correlations between the gain controlled signal GC and each of the first and the second local PN code sequences $LO_1$ and $LO_2$.

A subtractor 79 subtracts the second product from the first product to supply a loop filter 81 with a difference signal representative of a difference between the first and the second products. The difference signal is sent in the form of a variable voltage to the voltage controlled oscillator 75. The voltage controlled oscillator 75 produces the receiver clock pulses $CK_2$ having a repetition frequency determined by the voltage of the difference signal.

Synchronization is established when the difference between the first and the second products becomes equal to zero, as known in the art. This illustrated receiver synchronization circuit 54' is designed so that synchronization is established within the predetermined duration $T_0$.

Under the circumstances, the third local PN code sequence $LO_3$ is phase matched with the transmitter synchronization signal $SYNC_1$ conveyed by the gain controlled signal GC. In the example being illustrated, the third local PN code sequence $LO_3$ is delivered to a frame synchronization circuit 83 for defining each frame of the gain controlled signal GC. For this purpose, a sequence of frame pulses FR is produced by the frame synchronization circuit 83 in response to the third local PN code sequence $LO_3$ and delivered to the second PN generator 57 (FIG. 8) together with the receiver clock pulses $CK_2$.

In the illustrated receiver synchronization circuit 54', the additional multiplier 71 multiplies the third local PN code sequence $LO_3$ by the gain controlled signal GC to supply a third product to the additional low-pass filter 72. The third product specifies a correlation between the transmitter synchronization signal $SYNC_1$ and the third local PN code sequence $LO_3$. Specifically, the third product becomes large and small when the above-mentioned correlation is strong and weak, respectively. The strong correlation indicates presence of the transmitter synchronization signal $SYNC_1$ in the gain controlled signal GC while the weak correlation indicates absence of the transmitter synchronization signal $SYNC_1$.

Therefore, it is possible to detect whether the electric power line 30 is being used or unused, by monitoring the third product. Taking the above into consideration, the third product is produced through the additional low-pass filter 72 as a line status signal LS representative of a status of the electric power line 30. The line status signal LS takes a variable level in accordance with the third product.

After lapse of the predetermined duration $T_0$, the modulated signal MD' also appears in superposition on the transmitter synchronization signal $SYNC_1$ as the gain controlled signal GC. However, the synchronization has already been established in the receiver synchronization circuit 54' when the modulated signal MD' is received. In this event, the modulated signal MD' becomes a high frequency noise and can be rejected by the additional low-pass filter 72. In order to enable the above-mentioned operation, the modulated signal MD' may be substantially orthogonal to the transmitter synchronization signal $SYNC_1$.

Referring back to FIG. 8, the frame pulses FR and the receiver clocks $CK_2$ are sent to a second PN generator 57 which is similar to that illustrated in FIG. 7. The second PN generator 57 supplies the receiver multiplier 56 with a demodulation pseudorandom code sequence PD' in synchronism with the frame pulses FR and the receiver clocks $CK_2$. In the illustrated example, the demodulation pseudorandom code sequence PD' of each station is identical with the preselected pseudorandom code sequence PN' produced by the first PN generator 46 of each station because the preselected pseudorandom code sequence PN' is in common to all of the stations, as mentioned before.

The receiver multiplier 56 demodulates the gain controlled signal GC into a demodulated signal DM with reference to the demodulation pseudorandom code sequence PD' in the manner described in conjunction with FIG. 7. It is to be noted here that the demodulated signal DM conveys the destination address signal AD and the information signal IS. According to the above-mentioned assumption, the destination address signal AD specifies the station address assigned to the second station 32.

The demodulated signal DM is sent through the low-pass filter 61 to an address detector 85 for collating the station address assigned to each station, namely, the second station with the destination address specified by the destination address signal AD. When coincidence is detected between the assigned station address and the destination address as a result of collation, the address detector 85 puts a gate circuit 87 into an enable state. The demodulated signal DM is delivered as a reproduction of the information signal IS through the low-pass filter 61 and the gate circuit 87 to the terminal unit 33 while the gate circuit 87 is put into the enable state. Thus, communication can be carried out between the first and the second stations 31 and 32.

In FIG. 8, the receiver 37 further comprises a power detector 90 supplied with the line status signal LS from the receiver synchronization circuit 54' illustrated in FIG. 9. The illustrated power detector 90 produces the logic "1" level signal and the logic "0" level signal when the line status signal LS is low and high in level, respectively. In other words, the logic "1" level is produced from the power detector 90 when the transmitter synchronization signal $SYNC_1$ is not detected by the receiver synchronization circuit 54'. Otherwise, the logic "0" level signal appears from the power detector 90. This means that an output signal of the power detector 90 indicates presence or absence of the transmitter synchronization signal $SYNC_1$. Inasmuch as the transmitter synchronization signal $SYNC_1$ is derived from the receiver input signal on the electric power line 30, the output signal of the power detector 90 is representative of presence or absence of the receiver input signal.

At any rate, the power detector 90 is operatively coupled to the electric power line 30.

The AND gate 65 is enabled by the logic "1" level signal of the power detector 90 only when the receiver input signal is absent on the electric power line 30. Under the circumstances, the AND gate 65 energizes the modulator 47 and the synchronization generator 68 in response to the transmission request signal RQ, as mentioned before.

THIRD EMBODIMENT

Figure 10:
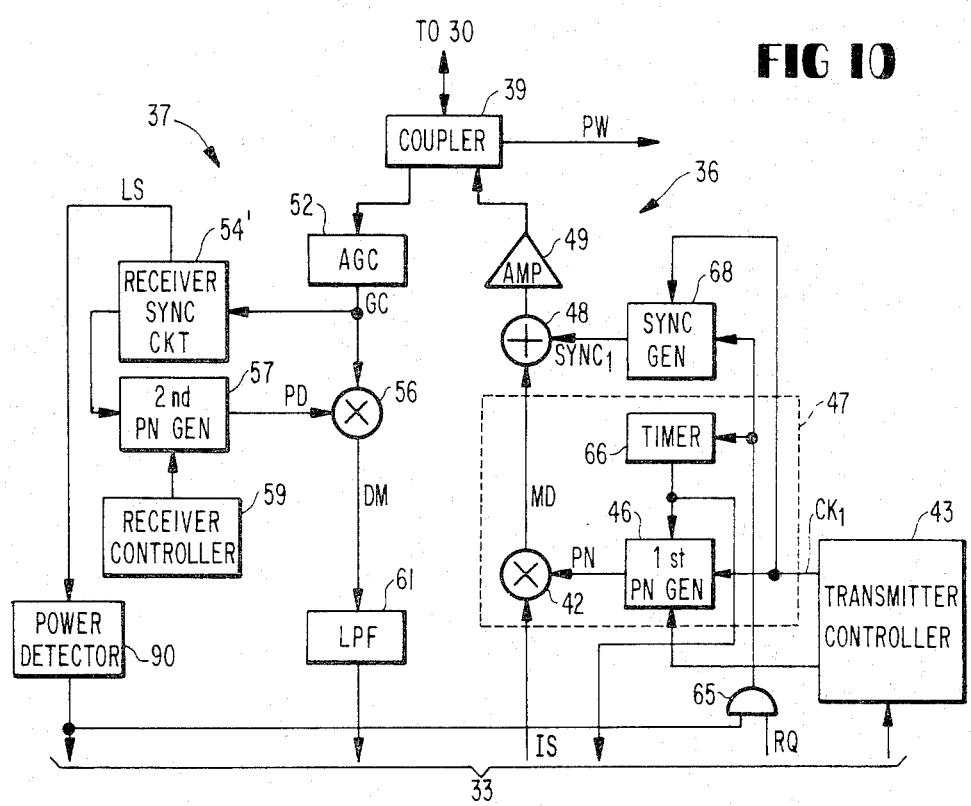
FIG. 10 is a block diagram of a station for use in the communication system according to the third embodiment of this invention.

Referring to FIG. 10, a station is for use in a communication system according to a third embodiment of this invention and is similar to that illustrated in FIG. 8 except that each station address is specified by pseudo-random code sequences which have phases peculiar to the respective stations, like in the stations described in conjunction with FIG. 7.

In this connection, the illustrated transmitter 36 is supplied with an initial phase signal from a transmitter controller 43 cooperating with the terminal unit or units. The initial phase signal specifies an initial phase assigned to a destination one of the stations and is produced by the transmitter controller 43 in response to an address indication given from each terminal unit.

Responsive to the initial phase signal, the first PN generator 46 produces a modulation pseudorandom code sequence PN specific to the destination station. The modulation pseudorandom code sequence is modulated by the information signal IS into a modulated signal MD in the manner described with reference to FIG. 7. The modulated signal MD is superposed on the transmitter synchronization signal $SYNC_1$, as mentioned in conjunction with FIG. 8, and is sent as the transmitter output signal to the electric power line 30.

The illustrated receiver 37 is operable in a manner similar to that described with reference to FIG. 7. More specifically, the second PN generator 57 is supplied with the initial phase signal from the receiver controller 59. As a result, the second PN generator 57 produces a demodulation pseudorandom code sequence PD peculiar to each station.

With this structure, the gain controlled signal GC is demodulated into the demodulated signal DM by the use of the peculiar pseudorandom code sequence PD. Consequently, the information signal IS is reproduced by the illustrated receiver 37 only when the peculiar pseudorandom code sequence PD is coincident with the modulation pseudorandom code sequence PN. Therefore, the address detector 85 and the gate circuit 87 illustrated in FIG. 8 become unnecessary in the receiver 37 shown in FIG. 10.

The power detector 90 and the AND gate 65 are operated in cooperation with the receiver synchronization circuit 54' to monitor status of the electric power line 30, like in FIG. 8.

FOURTH EMBODIMENT

Figure 11:
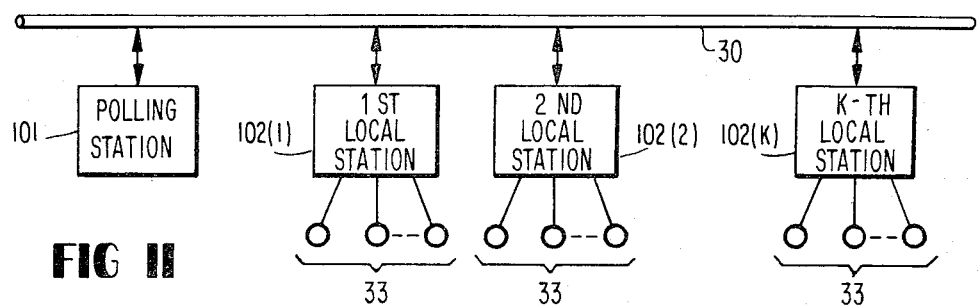
FIG. 11 is a block diagram of a communication system according to a fourth and a fifth embodiment of this invention.

Referring to FIG. 11, a communication system according to a fourth embodiment of this invention comprises an electric power line 30, a polling station 101 coupled to the electric power line 30, and a plurality of local stations which are consecutively numbered from a first station 102(1) to a K-th station 102(K) and which carry out communication through the electric power line 30 under control of the polling station 101 in a manner to be described later. Each of the local stations 102 (affixes omitted) is coupled to a single or a plurality of terminal units collectively shown at 33 and is also coupled to the electric power line 30 through a receptacle (not shown), as described in conjunction with FIG. 6.

Operation of the illustrated communication system will briefly be described with reference to FIG. 11. The polling station 101 at first carries out polling operation for selecting one of the local stations 102 to allow the selected local station to carry out transmission. The selected local station 102 can transmit an information signal to a destination local station, if the selected local station 102 requests transmission.

When the transmission of the information signal is completed in the selected local station 102, an end signal is sent from the selected local station 102 to the polling station 101. Responsive to the end signal, the polling station 101 carries out polling operation to select the next following one of the local stations. Such polling operation is possible by sending a polling signal to the next following local station. Thus, each local station is successively selected by the polling station 101.

From the above, it is readily understood that station addresses assigned to the polling and the local stations 101 and 102 should be specified on transmission of the polling signal, the information signal, and the end signal. In addition, the transmitter synchronization signal $SYNC_1$ is also transmitted in the above-mentioned manner.

In the illustrated communication system, spread spectrum modulation and demodulation are carried out in the polling station 101 and the local station 102 so as to transfer and receive the above-exemplified signals.

Figure 12:
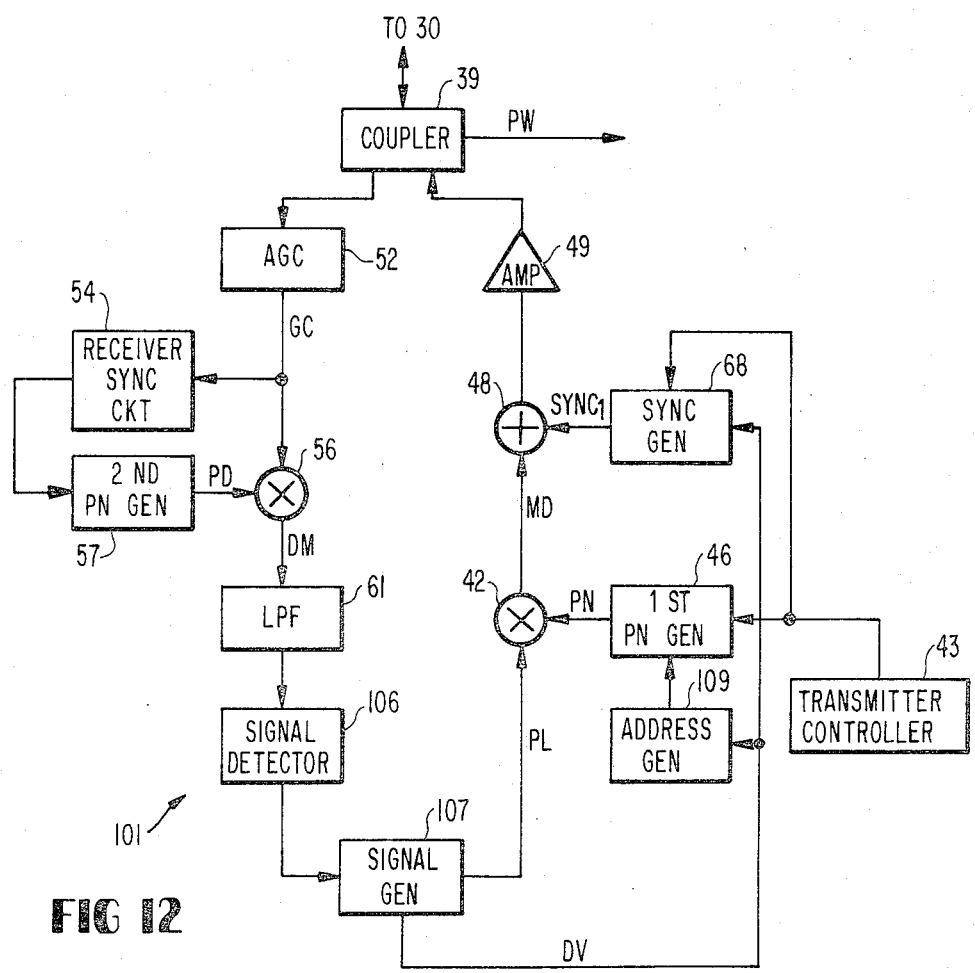
FIG. 12 is a block diagram of a polling station for use in the communication system illustrated in FIG. 11.

Referring to FIG. 12 together with FIG. 11, let the polling and the local stations 101 and 102 be assigned with pseudorandom code sequences specific thereto, respectively, like in the first and the third embodiments. As mentioned in conjunction with FIGS. 7 and 10, the specific pseudorandom code sequences serve to carry out the spread spectrum modulation and demodulation.

The specific pseudorandom code sequence assigned to the polling station 101 illustrated in FIG. 12 may be called a polling station code sequence.

In FIG. 12, the polling station 101 is similar to the station 31 or 32 illustrated in FIG. 7 except that a signal detector 106 and a signal generator 107 are connected between the low-pass filter 61 and the transmitter multiplier 42 and that an address generator 109 is coupled to the signal generator 107. Let the address generator 109 indicate a predetermined one of the station addresses.

It should be noted here that the second PN generator 57 produces the polling station code sequence as the demodulation pseudorandom code sequence PD in the manner described in conjunction with FIG. 7. The receiver multiplier 56 sends the demodulated signal DM through the low-pass filter 61 to the signal detector 106 only when the gain controlled signal GC conveys the polling station code sequence identical with the demodulation pseudorandom code sequence PD, as mentioned in conjunction with FIG. 7.

Supplied with the demodulated signal DM, the signal detector 106 detects whether or not the end signal is present in the demodulated signal DM. When the end signal is detected, the signal detector 106 supplies the signal generator 107 to a polling request signal representative of a request for polling. The signal generator 107 delivers the polling signal PL and a drive signal DV to the transmitter multiplier 42 and to the address generator 109, respectively.

Responsive to the drive signal DV, the address generator 109 changes the predetermined station address to the next following station address. The next following station address is given to the first PN generator 46 as a phase indication signal indicative of an initial phase of the specific pseudorandom code sequence assigned to the next following station. As a result, the specific pseudorandom code sequence assigned to the next following station is sent as the modulation pseudorandom code sequence PN to the transmitter multiplier 42.

The remaining operations are similar to those described with reference to FIG. 7 and will therefore not be described any longer.

In any event, the polling station 101 transmits, to the electric power line 30, a polling station output signal conveying the polling signal preceded by the transmitter synchronization signal $SYNC_1$, along with the next following station address specified by the specific pseudorandom code sequence. Likewise, the polling station 101 receives a polling station input signal conveying the transmitter synchronization signal $SYNC_1$ and the end signal along with the polling station code sequence.

Figure 13:
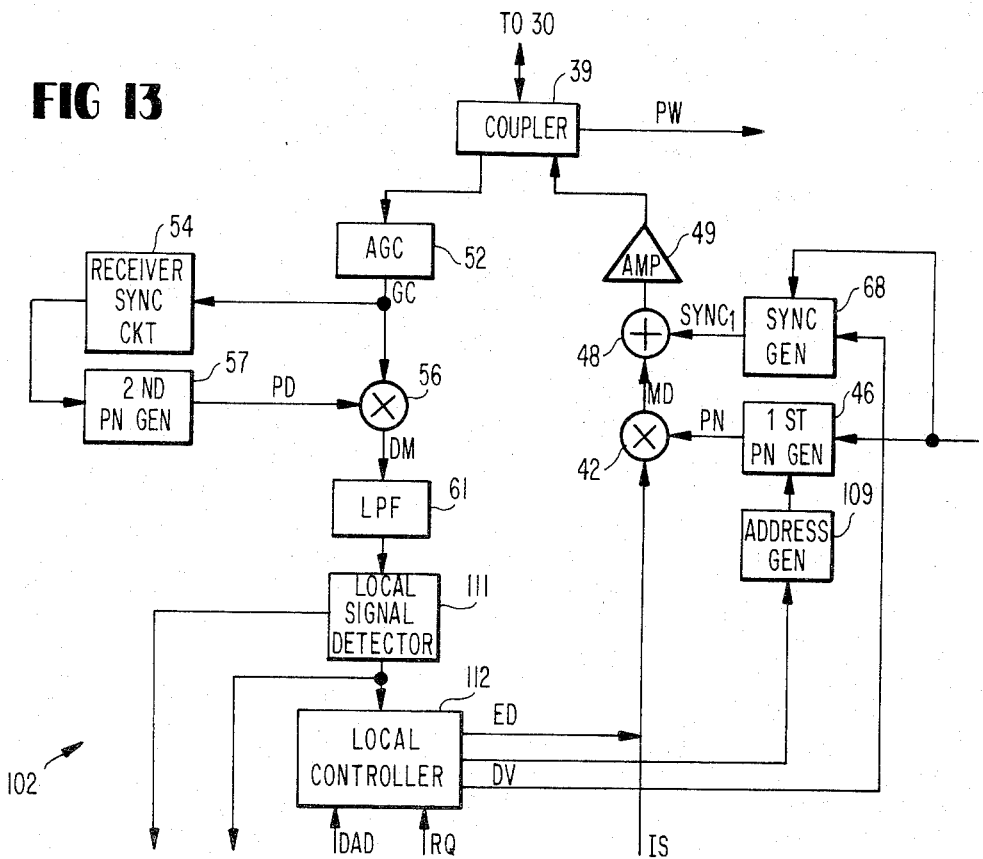
FIG. 13 is a block diagram of a block station for use in combination with the polling station illustrated in FIG. 12.

Referring to FIG. 13, the illustrated local station 102 is for use in combination with the polling station 101 illustrated with reference to FIG. 12 and is similar to the polling station 101 except that the local station 102 cooperates with each terminal unit 33. More specifically, the local station 102 sends a transmitter output signal (as will be described later) to the electric power line 30 and receives a receiver input signal from the electric power line 30. The transmitter output signal is delivered to either the polling station or another local station. The receiver input signal may be either the polling station output signal or the transmitter output signal sent from any other local station. Anyway, a local signal detector 111 is supplied as a detector input signal with the demodulated signal DM through the low-pass filter 61 when the receiver input signal conveys an assigned one of the specific pseudorandom code sequences that is assigned to the local station 102, as is the case with the signal detector 106 illustrated in FIG. 12.

The local signal detector 111 detects whether the detector input signal is either the polling signal or the information signal IS. The local signal detector 111 sends the information signal IS to the terminal unit 33 on detection of the information signal IS. On the other hand, the local signal detector 111 delivers an energization signal to the terminal unit 33 and to a local controller 112, on detection of the polling signal.

Responsive to the energization signal, the terminal unit 33 sends the transmission request signal RQ and a destination address DAD to the local controller 112, if the terminal unit 33 requests transmission. The local controller 112 delivers the drive signal DV to the synchronization signal generator 68 in response to the energization signal. This means that the drive signal DV is produced even when the transmission request signal RQ is not supplied to the local controller 112. Thus, the transmitter synchronization signal $SYNC_1$ is at first sent through the adder 48 and the transmitter amplifier 49 to the electric power line 30, irrespective of presence or absence of a transmission request signal RQ.

Let the transmission request signal RQ be given to the local controller 112. In this event, the destination address DAD is sent through the local controller 112 to an address generator 109 similar to that illustrated in FIG. 12. The address generator 109 produces an initial value which determines one of the specific pseudorandom code sequences that is in one-to-one correspondence to the destination address like in FIG. 12. As a result, the first PN generator 46 supplies the transmitter multiplier 42 with the one specific pseudorandom code sequence as the modulation pseudorandom code sequence PN. The modulation pseudorandom code sequence is modulated by the information signal IS sent from the terminal unit 33 in the above-mentioned manner.

When the information signal IS is completely transmitted, the local controller 112 delivers the polling station address as the destination address. Thereafter, the local controller 112 sends an end signal ED to the transmitter multiplier 42. Thus, the end signal ED is conveyed by the polling station code sequence and transmitted to the polling station 101 illustrated in FIG. 12.

Let no transmission request signal RQ be given to the local controller 112 from the terminal unit 33 on reception of the polling signal. In this event, the local controller 112 carries out operation similar to the completion of transmission of the information signal IS. Specifically, the end signal ED is instantaneously produced from the local controller 112 in response to the energization signal and conveyed by the polling station code sequence.

The local controller 112 is a combination of a gate circuit, an address generator, and an end signal generator which are all known in the art.

FIFTH EMBODIMENT

Figure 14:
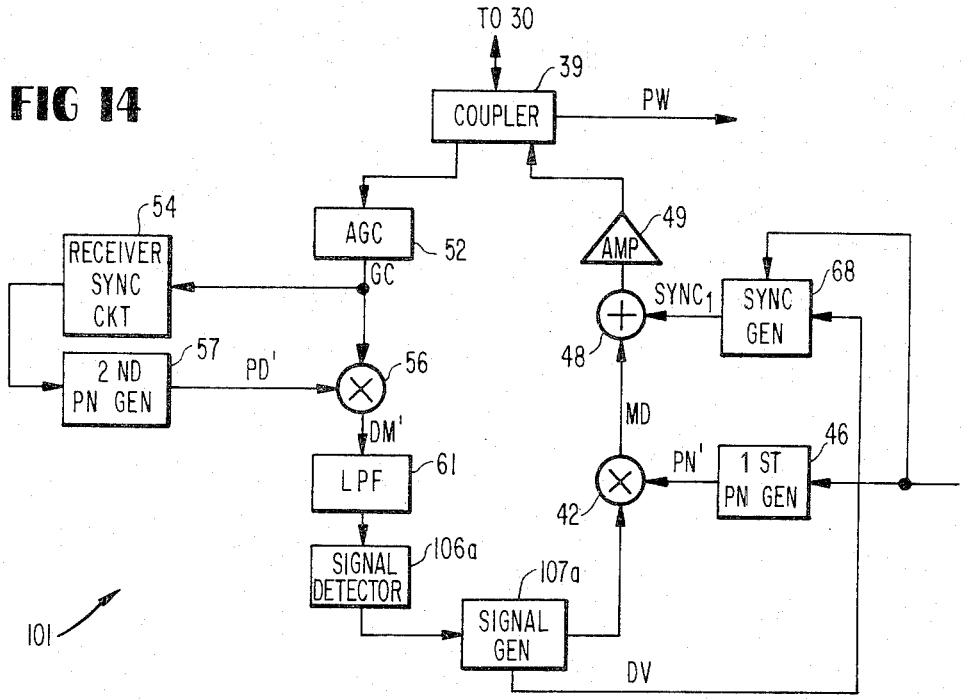
FIG. 14 is a block diagram of a polling station for use in a communication system according to the fifth embodiment of this invention.

Referring to FIG. 14, a polling station 101 is for use in a communication system according to a fifth embodiment of this invention and similar to that illustrated with reference to FIG. 12 except that a preselected or common pseudorandom code sequence alone is used in the communication system and that the common pseudorandom code sequence is modulated by each destination address.

In this event, the demodulated signal DM is sent from the receiver multiplier 56 even when the gain controlled signal GC does not convey the polling station address, as described in conjunction with FIG. 8. Therefore, a signal detector 106a detects not only the end signal but also the polling station address. When both of the polling station address and the end signal are detected by the signal detector 106a, a polling request is sent from the signal detector 106a to a signal generator 107a.

The illustrated signal generator 107a comprises a polling signal circuit for generating the polling signal, an address generator for generating the station address signals assigned to the respective local stations 102 as shown in FIG. 11, and a driver circuit for generating the drive signal DV.

With this structure, the drive signal DV is delivered from the signal generator 107a to the synchronization signal generator 68 in response to the polling request. Thereafter, one of the station address signals is selected and delivered to the transmitter multiplier 42 and followed by the polling signal. The selected station address and the polling signal modulate the modulation pseudorandom code sequence PN which is the common pseudorandom code sequence in the manner mentioned before.

The remaining operations are similar to those described in conjunction with FIG. 12 and will not be described any longer.

Figure 15:
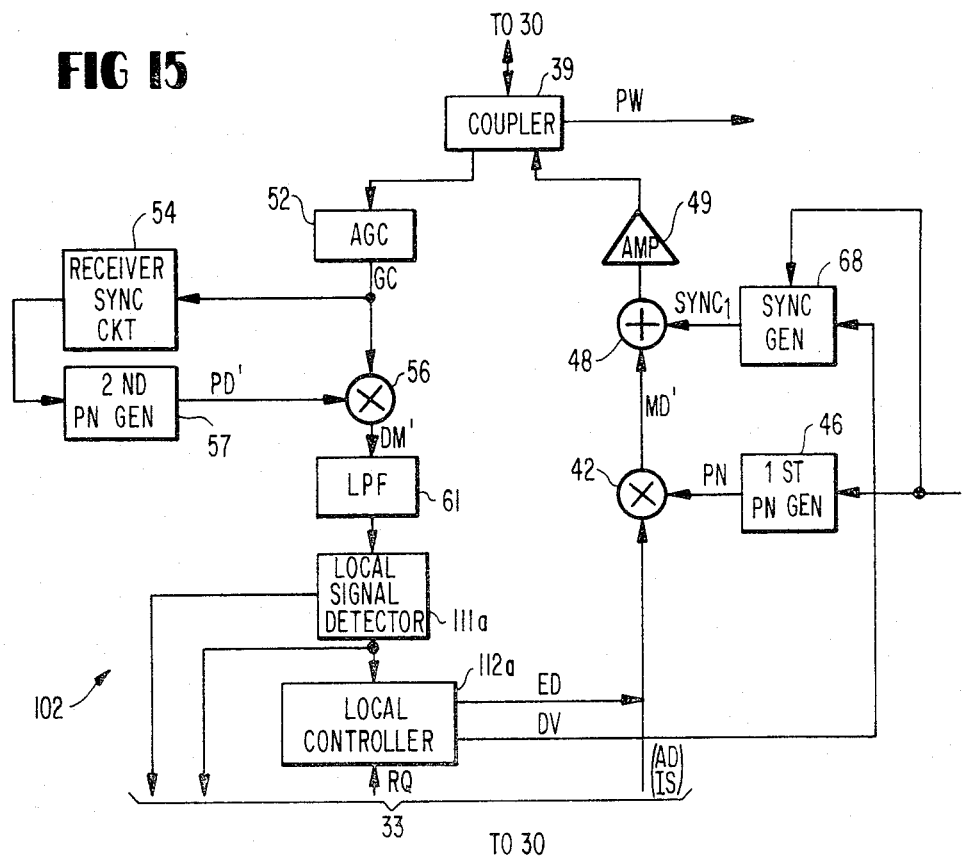
FIG. 15 is a block diagram of a local station for use in combination with the polling station illustrated in FIG. 14.

Referring to FIG. 15, the local station 102 is for use in combination with the polling station 101 illustrated in FIG. 14 and is similar to that shown in FIG. 13 except that the common pseudorandom code sequence is modulated by the destination address signal AD, the information signal IS, the polling signal, and the end signal ED and that such a modulated signal MD is transmitted as a transmitter output signal and received as a receiver input signal.

The demodulated signal DM' is supplied from the receiver multiplier 56 through the low-pass filter 61 to a local signal detector 111a. The illustrated local signal detector 111a comprises a part for detecting the station address assigned to the local station 102 and another part for detecting the polling signal. When the polling signal is not detected from the demodulated signal DM' after detection of the station address, the local signal detector 111a delivers a reproduction of the information signal IS to the terminal unit 33. On detection of the polling signal, the energization signal is sent to the terminal unit 33 and to a local controller 112a.

The local controller 112a delivers the drive signal DV to the synchronization signal generator 68 in response to the energization signal. If the transmission request signal RQ is not supplied to the local controller 112a, the end signal ED is sent from the local controller 112a to the transmitter multiplier 42. Otherwise, the end signal ED is produced after the destination address signal AD and the information signal IS are sent to the electric power line 30.

After production of the end signal ED, the local controller 112a deenergizes the synchronization signal generator 68.

Power Control Circuit

Figure 16:
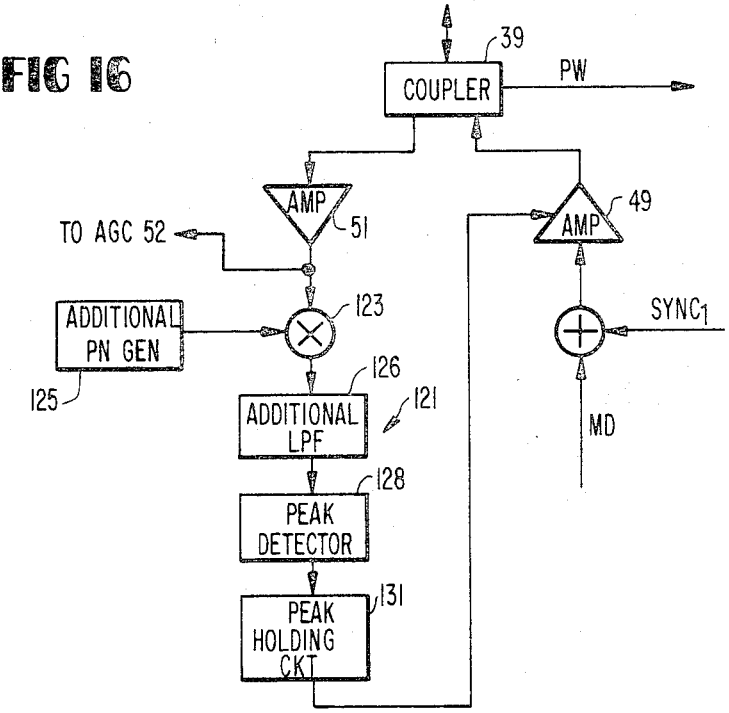
FIG. 16 is a block diagram of a power control circuit which is applicable to each of the embodiments.

Referring to FIG. 16, a power control circuit 121 is coupled between the receiver amplifier 51 and the transmitter amplifier 49 to keep electric power of the transmitter output signal stable on the electric power line 30. More particularly, the transmission characteristic is variable on the electric power line 30, as mentioned before. Electric power of the receiver input signal may undesiredly fluctuate due to variation of the transmission characteristic even when the automatic gain control circuit 52 is used in the receiver and the electric power of the transmitter output signal is kept substantially constant. Such fluctuation of the electric power of the receiver input signal makes stable demodulation impossible.

The illustrated power control circuit 121 serves to avoid the fluctuation of electric power of the receiver input signal. The receiver input signal is delivered from the electric power line 30 through the coupler 39 and the receiver amplifier 51 to an additional multiplier 123. The receiver input signal is also delivered to the automatic gain control circuit 52 in the abovementioned manner.

The additional multiplier 123 is supplied from an additional PN generator 125 with an additional pseudorandom code sequence. The additional PN generator 125 is driven by a sequence of additional clock pulses somewhat shifted from the transmitter clock pulses $CK_1$ (FIG. 8). Accordingly, the additional pseudorandom code sequence is phase shifted relative to the modulation pseudorandom code sequence PN. The receiver input signal is demodulated by the use of the additional pseudorandom code sequence into an additional demodulated signal. The additional demodulated signal is sent through an additional low-pass filter 126 to a peak detector 128. The peak detector 128 detects a peak of the additional demodulated signal sent through the additional low-pass filter 126.

The peak of the above-mentioned additional demodulated signal is held by the peak holding circuit 131 and is sent as a gain control signal to the transmitter amplifier 49. Specifically, when the electric power of the receiver input signal is large on the electric power line 30, the peak becomes high. In this event, the transmitter amplifier 49 is controlled by the gain control signal so that a gain of the transmitter amplifier 49 is reduced. On the other hand, the gain of the transmitter amplifier 49 is raised by the gain control signal when the peak is low.

Thus, the electric power of the receiver input signal is kept substantially constant by controlling the electric power of the transmitter output signal.

Figure 17:
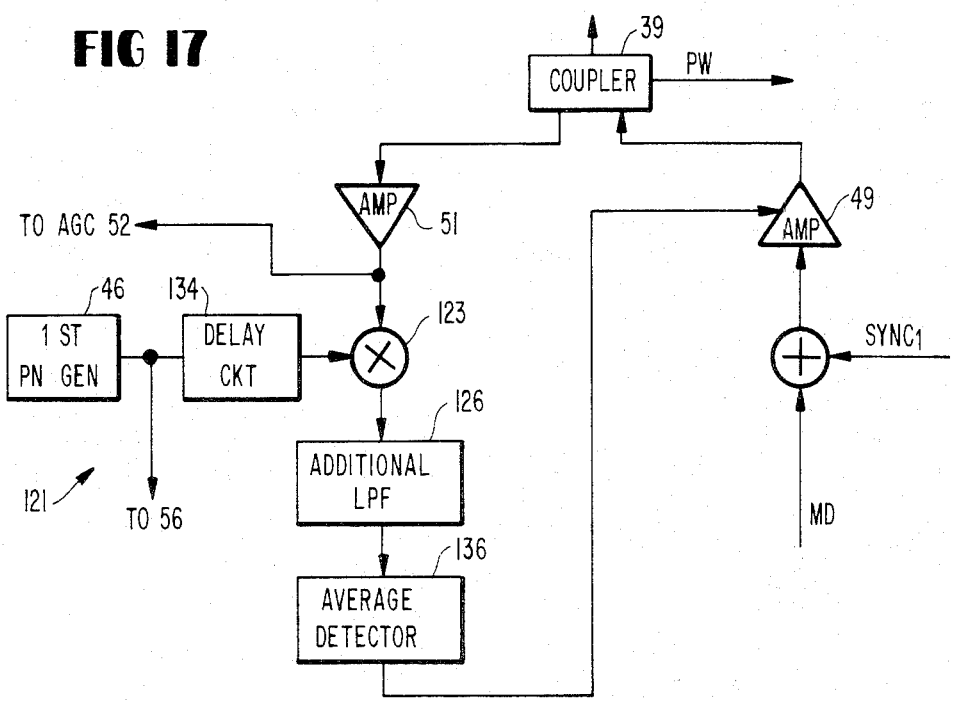
FIG. 17 is a block diagram of another control circuit for carrying out operation similar to that illustrated in FIG. 16.

Referring to FIG. 17, another power control circuit 121 produces the additional pseudorandom code sequence from the modulation pseudorandom code sequence PN generated by the first PN generator 46 (FIG. 7). For this purpose, the modulation pseudorandom code sequence PN is delayed by a delay circuit 134 having a delay time. The delay time is determined in consideration of a delay between modulation and demodulation of each station. This applies to the power control circuit illustrated in FIG. 16.

The additional demodulated signal is sent from the additional multiplier 123 through the additional low-pass filter 126 to an average circuit 136. The average circuit 136 detects an average of the additional demodulated signal to supply the transmitter amplifier 49 with an average signal as the gain control signal. The additional demodulated signal is dependent on the transmission characteristic of the electric power line. Thus, the transmitter amplifier 49 is controlled by the gain control signal in the manner described with reference to FIG. 16.

Figure 18:
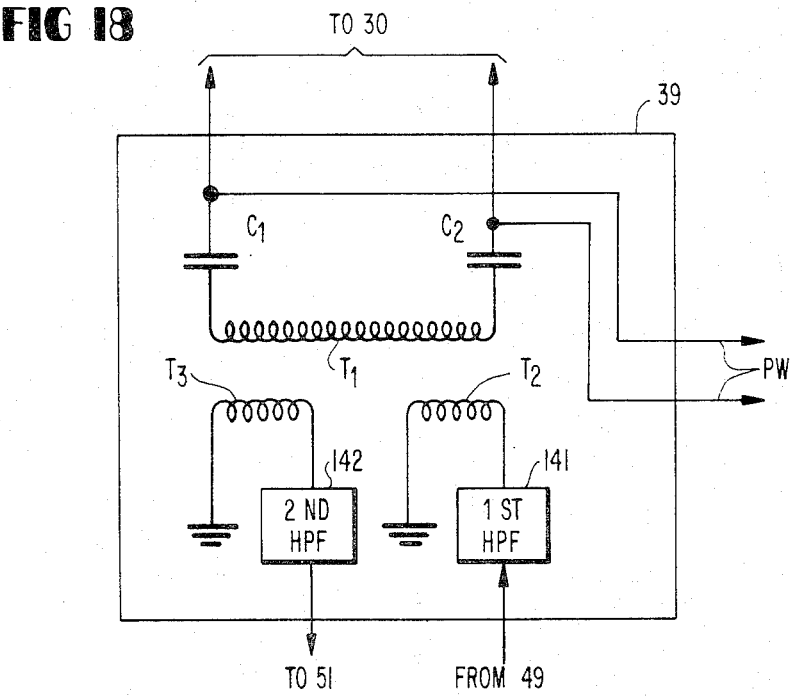
FIG. 18 is a circuit diagram of a coupler for use in each embodiment.

Referring to FIG. 18, the coupler illustrated in each of the first through the fifth embodiments and the modifications comprises a first winding $T_1$ connected to the electric power line 30 through a pair of capacitors $C_1$ and $C_2$, a second winding $T_2$ connected through a first high-pass filter 141 to the transmitter amplifier 49, and a third winding $T_3$ connected through a second high-pass filter 142 to the receiver amplifier 51. The capacitors $C_1$ and $C_2$ rejects the electric power of the commercial frequency while the first and the second high-pass filters 141 and 142 attenuate low frequency components of the transmitter output signal and the receiver input signal, respectively.

The transmitter output signal is transmitted to the electric power line 30 by electromagnetic coupling between the second and the first windings $T_2$ and $T_1$. On the other hand, the receiver input signal is received by electromagnetic coupling between the first and the third windings $T_1$ and $T_3$.

Automatic Gain Control Circuit

Figure 19:
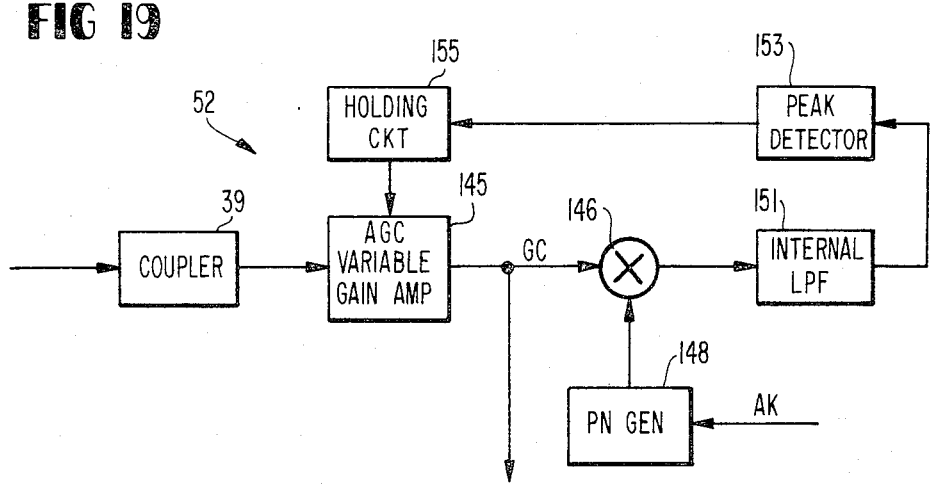
FIG. 19 is a block diagram of an automatic gain control circuit which is applicable to each embodiment.

Referring to FIG. 19, the automatic gain control circuit 52 comprises a variable gain amplifier 145 supplied with the receiver input signal from the electric power line 30 through the coupler 39. An output signal is delivered as the gain controlled signal GC to the receiver multiplier 56 and to an internal multiplier 146.

A subsidiary PN generator 148 is coupled to the internal multiplier 146 to produce a subsidiary pseudorandom code sequence identical with the modulation pseudorandom code sequence. The subsidiary PN generator 148 is driven by a sequence of additional clock pulses AK somewhat different in frequency from the transmitter clock pulse sequence $CK_1$. Therefore, the subsidiary pseudorandom code sequence is not synchronized with the receiver input signal.

With this structure, a detection output signal is always supplied from the internal multiplier 146 and appears irrespective of establishment of synchronization between the receiver input signal and the subsidiary pseudorandom code sequence. Anyway, an output signal of the internal low-pass filter 151 has a peak value corresponding to the receiver input signal and is given to a peak detector 153. The peak value is detected by the peak detector 153 and held in a holding circuit 155. The holding circuit 155 supplies the variable gain amplifier 145 with a gain control signal in accordance with the peak value held in the holding circuit 155. The gain of the variable gain amplifier 145 is reduced and increased when the gain control signal is high and low, respectively.

Thus, the illustrated automatic gain control circuit 52 is operated regardless of synchronizing operation and can therefore carry out a stable operation. This means that an automatic gain control operation of the receiver is rapidly started even when synchronization is not established.

Modification

Figure 20:
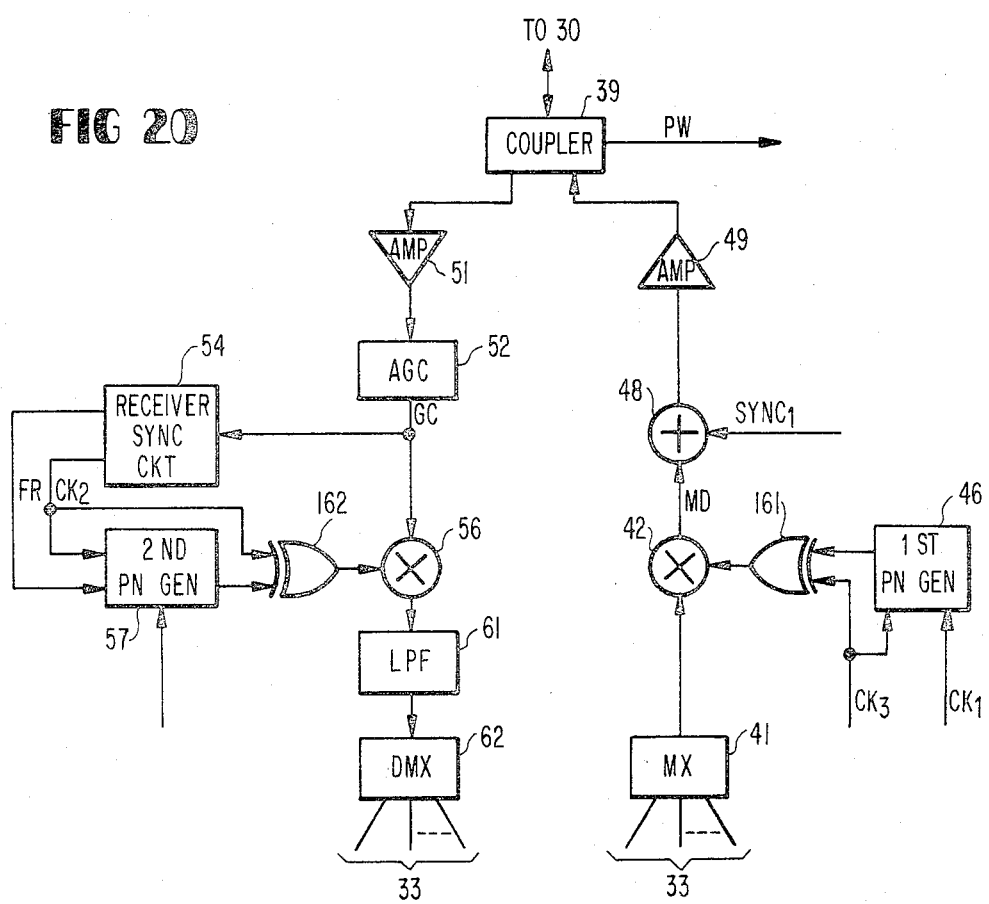
FIG. 20 is a block diagram of a station for use in a communication system according to a modification of this invention.

Referring to FIG. 20, a station according to a modification of this invention is similar to that illustrated in FIG. 7 except that first and second Exclusive OR gates 161 and 162 are connected to the first and the second PN generators 46 and 57 of the transmitter 36 and the receiver 37, respectively. The first Exclusive OR gate 161 serves to encode the pseudorandom code sequence of the first PN generator 46 into a Manchester code known in the art. To this end, the first Exclusive OR gate 161 carries out an Exclusive OR operation between the pseudorandom code sequence and a clock sequence $CK_3$ to produce a pseudorandom code sequence of the Manchester code as the modulation pseudorandom code sequence.

Likewise, the demodulation pseudorandom code sequence of the Manchester code is sent from the second Exclusive OR gate 162 to the receiver multiplier 56. More particularly, the receiver synchronization circuit 54 delivers the frame pulses FR and the receiver clock pulses $CK_2$ to the second PN generator 57 in the manner described in conjunction with FIG. 9. The receiver clock pulses $CK_2$ are also delivered to the second Exclusive OR gate 162. The second PN generator 57 generates a pseudorandom code sequence in a manner similar to that illustrated with reference to FIG. 7. The pseudorandom code sequence is encoded into the demodulation pseudorandom code sequence of the Manchester code by the second Exclusive OR gate 162.

The Manchester code is specified by a phase and may be called a phase code. Any other phase codes may be used instead of the Manchester code. It has been found out that use of such a phase code can reduce a low frequency component of the electric power spectrum of the transmitter output signal. Accordingly, the electric power signal of the commercial frequency band is not inversely affected by the transmission of the information signal.

Receiver Synchronization Circuit

Figure 21:
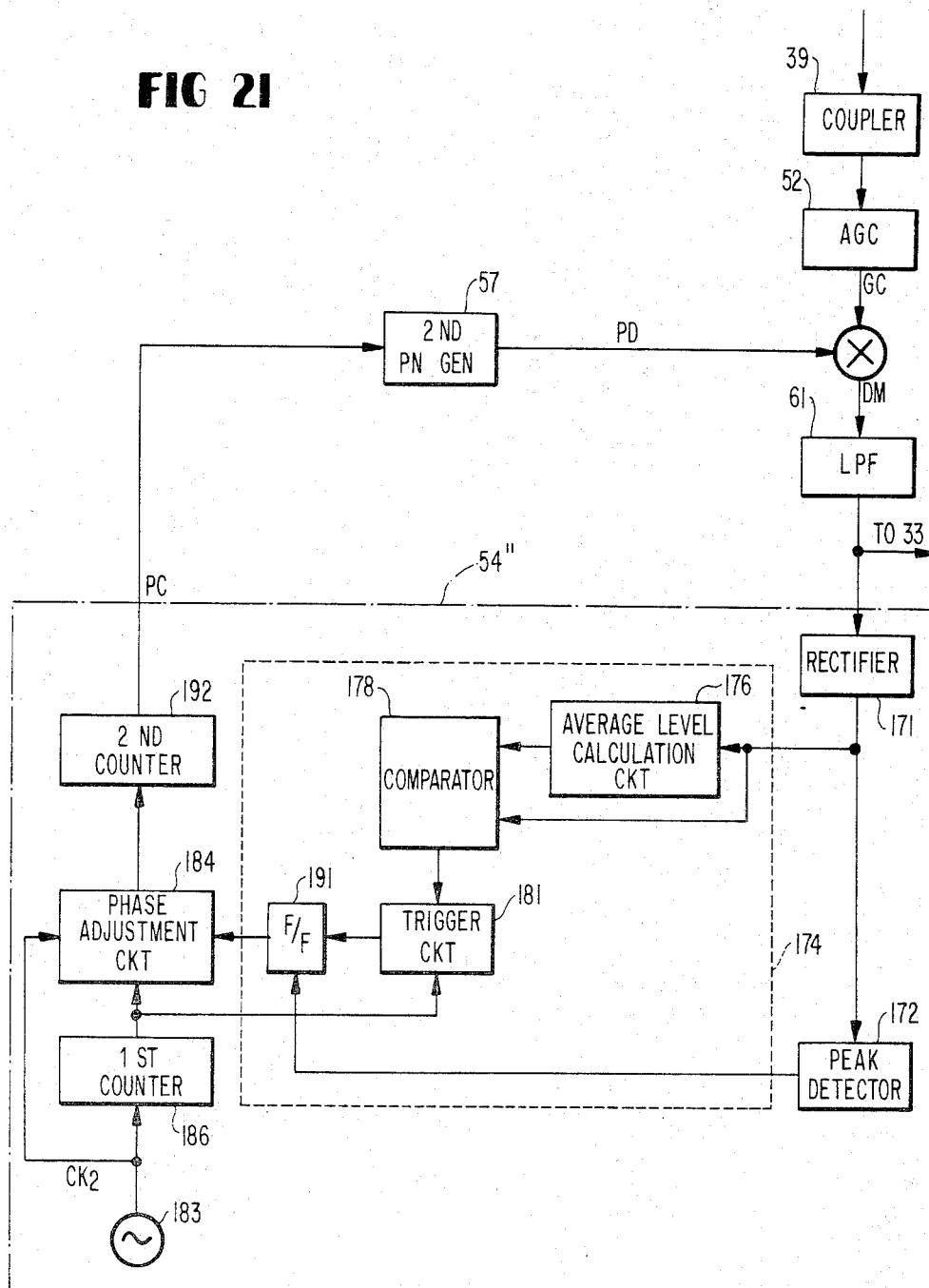
FIG. 21 is a block diagram of a receiver synchronization circuit which is applicable to each embodiment.

Referring to FIG. 21, a receiver synchronization circuit 54'' is operable in response to a filter output signal supplied from the low-pass filter 61 to supply the second PN generator 57 with a sequence of phase controlled pulses PC in a manner to be described later. The second PN generator 57 generates the demodulation pseudorandom code sequence PD in synchronism with the phase controlled pulses PC. When synchronization is not established between the demodulation pseudorandom code sequence PD and the transmitter clock pulses $CK_1$ included in the gain controlled signal GC, the phase controlled pulses PC are successively delayed relative to the gain controlled signal GC. Under the circumstances, one of the phase controlled pulses PC will appear, simultaneously with one of the transmitter clock pulses $CK_1$ some time. At this time, the demodulated signal DM exhibits a signal peak.

The demodulated signal DM is sent through the low-pass filter 61 as the filter output signal to a full-wave rectifier 171. The full-wave rectifier 171 rectifies the filter output signal into a rectified signal which is delivered to a peak detector 172.

When the signal peak appears in the demodulated signal DM, the signal peak is sent through the full-wave rectifier 171 to the peak detector 172. The signal peak is kept in the peak detector 172 until the next following signal peak is detected by the peak detector 172 when each of the signal peaks is higher than a first threshold level. On detection of the next following signal, the first threshold level is reduced to a second threshold level. The peak detector 172 begins to produce the logic "1" level on detection of the next following signal. The logic "1" level lasts until a level of the rectified signal becomes lower than the second threshold level. This is because the synchronization is being established during the second threshold level, as will become clear as the description proceeds.

The rectified signal is also delivered to a phase control circuit 174 coupled to the peak detector 172. The phase control circuit 174 comprises an average level calculation circuit 176 for calculating an average level of the rectified signal to produce an average level signal representative of the average level. A comparator 178 compares the rectified signal with the average level signal to produce the logic "1" level when the level of the rectified signal is higher than the average level. Otherwise, the logic "0" level is produced by the comparator 178. The logic "1" level appears from the comparator 178 when the phase controlled pulses PC are advanced in phase relative to the transmitter clock pulses $CK_1$. Otherwise, the logic "0" level appears from the comparator 178. Such a comparator output signal is sent to a trigger circuit 181 operable in a manner to presently be described.

The illustrated phase control circuit 174 further comprises an oscillator 183 for generating the receiver clock sequence $CK_2$ of a predetermined repetition frequency. The receiver clock sequence $CK_2$ is delivered to a phase adjustment circuit 184 (will be described later) and to a first counter 186 coupled to the phase adjustment circuit 184. The first counter 186 is operable as a frequency divider of a factor equal to three or four and supplies a frequency divided clock sequence to the trigger circuit 181 of the phase control circuit 174 and to the phase adjustment circuit 184.

The trigger circuit 181 produces a trigger pulse in synchronism with the frequency divided clock sequence when the logic "0" level is supplied from the comparator 178. In other words, the trigger pulse does not appear when the level of the rectified signal is not lower than the average level.

Each trigger pulse is sent to a flip flop 191 coupled to the peak detector 172. The flip flop 191 changes status from one to another in response to the trigger pulse to produce a flip flop output signal while the logic "1" level is given from the power detector 172 to the flip flop 191. The flip flop output signal is supplied to the phase adjustment circuit 184.

Let the logic "1" level be sent from the peak detector 172 to the flip flop 191 in the manner mentioned before. Under the circumstances, when the level of the rectified signal is lower than the average level, the trigger circuit 181 delivers the trigger pulse to the flip flop 191 in response to one of the frequency divided clocks. In this event, the flip flop output signal is changed from the logic "0" level to the logic "1" level.

When the flip flop output signal takes the logic "1" level, the phase adjustment circuit 184 increases the number of the receiver clock pulses $CK_2$. The increased receiver clock pulses are frequency divided by a second counter 192 in a manner similar to the first counter 186 to be supplied as the phase controlled pulse sequence PC to the second PN generator 57.

Thus, the demodulation pseudorandom code sequence PD is gradually advanced in phase in response to the phase controlled pulse sequence PC. As a result, the demodulation pseudorandom code sequence PD is synchronized with the modulation pseudorandom code sequence carried by the gain controlled signal GC. When the synchronization is established, the level of the rectified signal increases and becomes higher than the average level of the average signal produced by the average level calculation circuit 176. Accordingly, the trigger circuit 181 suppresses production of the trigger pulse even when the frequency divided pulse is given from the counter 186 to the trigger circuit 181. The flip flop output signal is kept at the logic "1" level.

Thereafter, the level of the rectified signal is reduced due to a further advance of the phase of the demodulation pseudorandom code sequence. When the level of the rectified signal becomes lower than the average level of the average signal, the flip flop output signal is changed from the logic "1" level to the logic "0" level.

Responsive to the logic "0" level, the phase adjustment circuit 184 reduces the number of the receiver clock pulses to produce the reduced receiver clock pulses as the phase controlled pulse sequence. Therefore, the phase of the demodulation pseudorandom code sequence is delayed relative to the modulation pseudorandom code sequence.

Similar operation is stably carried out to keep the synchronization between the demodulation and the modulation pseudorandom code sequences because such operation is independent of the automatic gain control operation.

While this invention has thus far been described in conjunction with several embodiments thereof, it will readily be possible for those skilled in the art to put this invention into practice in various other manners. For example, unidirectional communication may be carried out between a single transmitter and a single receiver through the electric power line 30. In this event, no address signal may be transmitted from the single transmitter to the single receiver.

What is claimed is:

1. A system for use in conveying a tranmission signal from a transmission station to a reception station through an electric power line for electric power of a commercial frequency falling within a first frequency range, said electric power line having a variable loss, said transmission station comprising:

modulation means responsive to said transmission signal for carrying out spread spectrum modulation of said transmission signal by the use of a first pseudorandom code to produce a modulated signal which is subject to said spread spectrum modulation and which is dispersed in a second frequency range different from said first frequency range;

sychronization signal producing means for producing a sychronization signal; and combining means coupled to said electric power line, said modulating means, and said synchronization signal producing means for combining said modulated signal and said synchronization signal into a combined signal to supply said electric power line with said combined signal;

said reception station comprising:

demodulating means coupled to said electric power line for demodulating said combined signal into a demodulated signal by the use of a second pseudorandom code corresponding to said first pseudorandom code, said demodulated signal comprising a reproduction of said modulated signal and a synchronization component representing said synchronization signal, and having a variable level resulting from said variable loss of the electric power line;

clock pulse generating means coupled to said demodulating means for generating a sequence of clock pulses in response to said synchronization component and said variable power level; and means coupled to said clock pulse generating means and said demodulating means for supplying said demodulating means with said second pseudorandom code which is synchronized with said clock pulse sequence.

2. A system as claimed in claim 1, wherein said clock pulse generating means comprises:

deriving means coupled to said demodulating means for deriving said synchronization component from said demodulated signal;

clock control means coupled to said deriving means for producing a clock control signal dependent on said variable level, in synchronism with said synchronization component; and clock signal means coupled to said clock control means for producing said clock pulse sequence in response to said clock control signal.

3. A system as claimed in claim 2, wherein said deriving means comprises:

rectifying means for rectifying said demodulated signal into a rectified signal; and peak detecting means coupled to said rectifying means for successively detecting a peak of said rectified signal to produce said synchronization component.

4. A system as claimed in claim 3, wherein said clock control means comprises:

average calculating means coupled to said rectifying means for calculating an average level of said rectified signal to produce an average level signal representative of said average voltage level, said average level corresponding to said variable level;

comparing means coupled to said rectifying means and said average calculating means for comparing said rectified signal with said average level signal to produce a result signal representative of a result of said comparison; and means coupled to said peak detecting means and said comparing means for producing said clock control signal in response to said result signal and said synchronization component.

5. A system as claimed in claim 1, wherein said demodulating means comprises:
gain controlling means coupled to said electric power line and responsive to said combined signal for controlling the gain of said combined signal to produce a gain controlled signal; and
means coupled to said gain controlling means and said second pseudorandom code for extracting said demodulated signal from said combined signal.

6. A system as claimed in claim 5, wherein said gain controlling means comprises:
variable gain means controllable by a gain control signal and responsive to said combined signal for producing said gain controlled signal;
code generating means for generating an additional pseudorandom code which is identical with said first pseudorandom code and which has a frequency different from said first pseudorandom code;
multiplying means for multiplying said gain controlled signal by said additional pseudorandom code to produce a product signal representative of a produce of said gain controlled signal and said additional pseudorandom code;
peak detecting means coupled to said multiplying means for detecting a peak value of said product signal; and
means coupled to said peak detecting means for supplying said peak value to said variable gain means as said gain control signal.

7. A system as claimed in claim 1, further comprising power control means coupled to said combining means and said demodulating means for controlling the gain of said combined signal in response to said demodulated signal.

8. A system comprising an electric power line, a polling station coupled to said electric power line for carrying out a polling operation, and a plurality of communication stations for carrying out communication through said electric power line under control of said polling station, said electric power line being for transmitting electric power at a commercial frequency falling within a first frequency range, each of said polling station and said communication stations comprising:
modulation means responsive to said transmission signal for carrying out spread spectrum modulation of said transmission signal by the use of a first pseudorandom code to produce a modulated signal which is subject to said spread spectrum modulation and which is dispersed in a second frequency range different from said first frequency range;
synchronization signal producing means for producing a synchronization signal; and
combining coupled to said electric power line, said modulation means, and said synchronization signal producing means for combining said modulated signal and said synchronization signal into a combined signal to supply said electric power line with said combined signal;
demodulating means coupled to said electric power line for demodulating said combined signal into a demodulated signal by the use of a second pseudorandom code corresponding to said first pseudorandom code, said demodulated signal comprising a reproduction of said modulated signal and having a variable level resulting from said variable loss of the electric power line;
clock pulse generating means coupled to said demodulation means for producing a sequence of clock pulses with reference to a synchronization component, conveyed by said demodulated signal, and to said variable level; and
means coupled to said clock pulse generating means and said demodulating means for supplying said demodulating means with said second pseudorandom code which is synchronized with said clock pulse sequence.

9. A system as claimed in claim 8, wherein said clock pulse generating means comprises:
deriving means coupled to said demodulating means for deriving said synchronization component from said demodulated signal;
clock control means coupled to said deriving means for producing a clock control signal dependent on said variable level, in synchronism with said synchronization component; and
clock signal means coupled to said clock control means for producing said clock pulse sequence in response to said clock control signal.

10. A system as claimed in claim 9, wherein said deriving means comprises:
rectifying means for rectifying said demodulated signal into a rectified signal; and
peak detecting means coupled to said rectifying means for successively detecting a peak of said rectified signal to produce said synchronization component.

11. A system as claimed in claim 10, wherein said clock control means comprises:
average calculating means coupled to said rectifying means for calculating an average level of said rectified signal to produce an average level signal representative of said average level, said average level corresponding to said variable level;
comparing means coupled to said rectifying means and said average calculating means for comparing said rectified signal with said average level signal to produce a result signal representative of a result of said comparison; and
means coupled to said peak detecting means and said comparing means for producing said clock control signal in response to said result signal and said synchronization component.

12. A system as claimed in claim 8, wherein said demodulating means comprises:
gain controlling means coupled to said electric power line for controlling a gain of said combined signal to produce a gain controlled signal; and
means coupled to said gain controlling means and said second pseudorandom code for extracting said demodulated signal from said combined signal.

13. A system as claimed in claim 12, wherein said gain controlling means comprises:
variable gain means controllable by a gain control signal and responsive to said combined signal for producing said gain controlled signal;
code generating means for generating an additional pseudorandom code which is identical with said first pseudorandom code and which has a frequency different from said first pseudorandom code;

multiplying means for multiplying said gain controlled signal by said additional pseudorandom code to produce a product signal representative of a product of said gain controlled signal and said additional pseudorandom code;

peak detecting means coupled to said multiplying means for detecting a peak value of said product signal; and means coupled to said peak detecting means for supplying said peak value to said variable gain means as said gain controlled signal.

14. A system as claimed in claim 8, further comprising power control means coupled to said combining means and said demodulating means for controlling a gain of said combined signal in response to said demodulated signal.

* * * * *

UNITED STATES PATENT AND TRADEMARK OFFICE
CERTIFICATE OF CORRECTION

PATENT NO. : 4,641,322

DATED : February 3, 1987

INVENTOR(S) : S. HASEGAWA

It is certified that error appears in the above-identified patent and that said Letters Patent is hereby corrected as shown below:

Column 2, line 33, delete "5(d)" insert --5(c)--;

Column 19, line 63, delete "tranmission" insert --transmission--;

Column 21, line 58, insert --means-- after "combining".

Signed and Sealed this

Nineteenth Day of April, 1988

Attest:

DONALD J. QUIGG

*Attesting Officer*  *Commissioner of Patents and Trademarks*